US008058585B2

(12) United States Patent
Amemiya et al.

(10) Patent No.: US 8,058,585 B2
(45) Date of Patent: Nov. 15, 2011

(54) PLASMA PROCESSING METHOD, PLASMA PROCESSING APPARATUS AND STORAGE MEDIUM

(75) Inventors: Hiroki Amemiya, Nirasaki (JP); Akihito Toda, Nirasaki (JP); Hiroshi Nagahata, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 866 days.

(21) Appl. No.: 11/716,677

(22) Filed: Mar. 12, 2007

(65) Prior Publication Data
US 2007/0221632 A1  Sep. 27, 2007

Related U.S. Application Data

(60) Provisional application No. 60/792,978, filed on Apr. 19, 2006.

(30) Foreign Application Priority Data

Mar. 13, 2006 (JP) .................................. 2006-068049
Oct. 20, 2006 (JP) .................................. 2006-286591

(51) Int. Cl.
*B23K 9/02* (2006.01)
*H01L 27/14* (2006.01)
*G02B 3/00* (2006.01)

(52) U.S. Cl. ........... 219/121.36; 219/121.59; 219/121.4; 219/121.43; 216/26; 216/67

(58) Field of Classification Search ............. 219/121.36, 219/121.38, 121.4, 121.41, 121.43, 121.44, 219/121.54; 156/345.48; 216/26, 67
See application file for complete search history.

(56) References Cited

U.S. PATENT DOCUMENTS

| 5,326,404 | A | * | 7/1994 | Sato ...................... 118/723 MR |
| 5,494,522 | A | * | 2/1996 | Moriya et al. .................. 118/719 |
| 5,525,159 | A | * | 6/1996 | Hama et al. .................. 118/723 I |
| 5,578,164 | A | * | 11/1996 | Kurono et al. .................. 216/71 |
| 5,834,730 | A | * | 11/1998 | Suzuki et al. ............. 219/121.43 |
| 5,948,281 | A | | 9/1999 | Okazaki et al. |
| 5,997,756 | A | | 12/1999 | Okazaki et al. |
| 6,163,407 | A | | 12/2000 | Okazaki et al. |
| 6,700,089 | B1 | * | 3/2004 | Hirooka ..................... 219/121.4 |
| 6,818,560 | B1 | * | 11/2004 | Koshimizu et al. ........... 438/706 |
| RE39,020 | E | * | 3/2006 | Hama et al. ............... 156/345.48 |
| 2005/0061772 | A1 | * | 3/2005 | Amemiya ....................... 216/26 |

FOREIGN PATENT DOCUMENTS

| JP | 10-148704 | 6/1998 |
| JP | 2005-101232 | 4/2005 |

* cited by examiner

*Primary Examiner* — Tu B Hoang
*Assistant Examiner* — Brian Jennison
(74) *Attorney, Agent, or Firm* — Smith, Gambrell & Russell, LLP

(57) ABSTRACT

A plasma processing method includes the steps of: loading a substrate on a lower electrode, the substrate having a resist mask formed on a transcription film; supplying a processing gas into a processing chamber; forming a magnetic field, which is oriented toward one direction and perpendicular to a line connecting an upper and the lower electrode; supplying a high frequency power to the lower electrode in the processing chamber to thereby form an electric field; converting the processing gas into a plasma by a magnetron discharge caused by a presence of an orthogonal electromagnetic field; and forming lenses on the transcription film by using the plasma. The high frequency power is supplied to the lower electrode while controlling the magnitude of the electric power divided by a surface area of the substrate to be in a range from about 1200 W/31415.9 $mm^2$ to 2000 W/31415.9 $mm^2$.

13 Claims, 14 Drawing Sheets

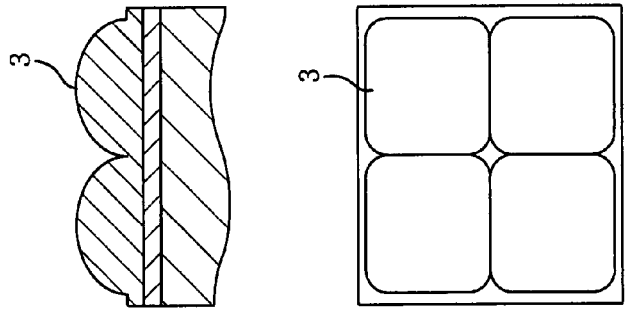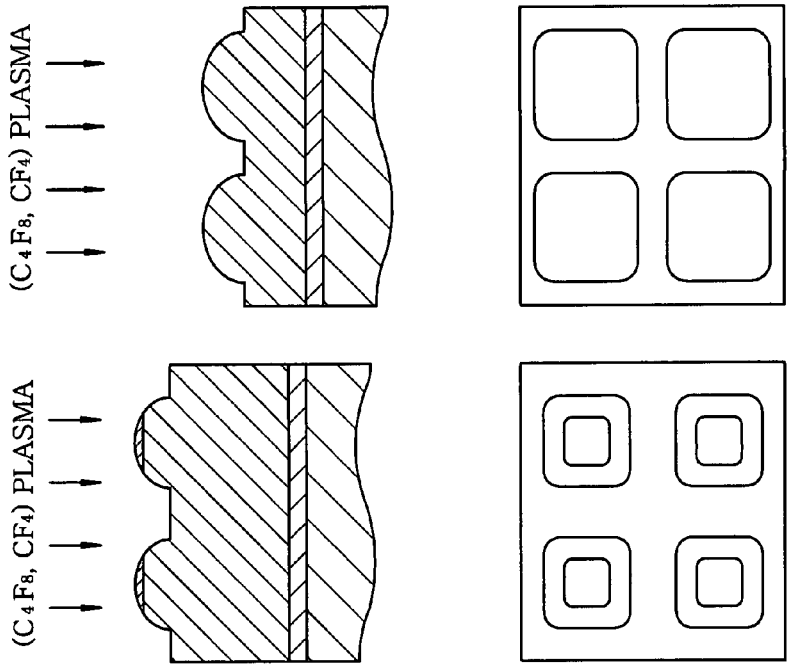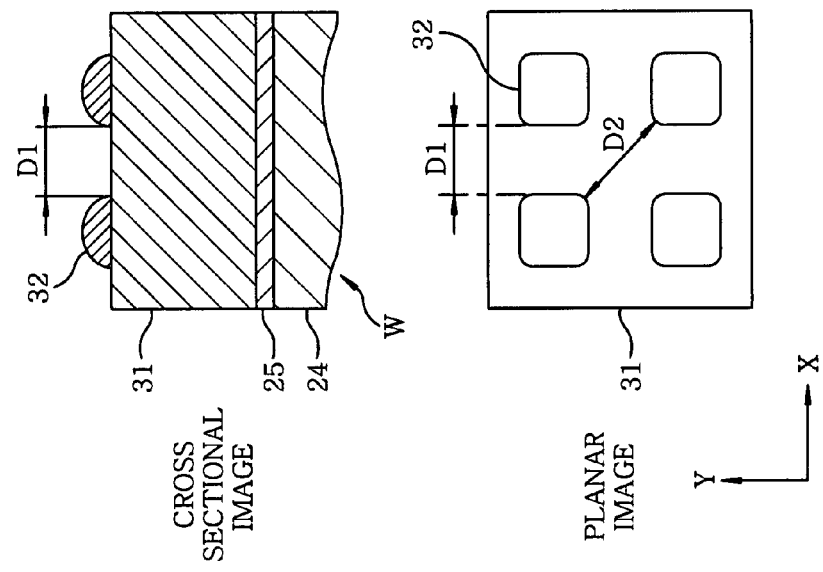

FIG.7A

CROSS TABLE

| LEVEL No | TEMPERATURE OF MOUNTING TABLE 41 | ELECTRIC POWER OF HIGH FREQUENCY POWER SUPPLY 63 | SUM OF FLOW RATES OF CF4 AND C4F8 GASES | FLOW RATE RATIO OF CF4 GAS / C4F8 GAS |
|---|---|---|---|---|
| 1 | 1 | 1 | 1 | 1 |
| 2 | 1 | 2 | 2 | 2 |
| 3 | 1 | 3 | 3 | 3 |
| 4 | 2 | 1 | 2 | 3 |
| 5 | 2 | 2 | 3 | 1 |
| 6 | 2 | 3 | 1 | 2 |
| 7 | 3 | 1 | 3 | 2 |
| 8 | 3 | 2 | 1 | 3 |
| 9 | 3 | 3 | 2 | 1 |

FIG.7B

CONDITION TABLE

| EXPERIMENT No | TEMPERATURE OF MOUNTING TABLE 41 (°C) | ELECTRIC POWER OF HIGH FREQUENCY POWER SUPPLY 63 (W) | SUM OF FLOW RATES OF CF4 AND C4F8 GASES (sccm) | FLOW RATE RATIO OF CF4 GAS / C4F8 GAS (-) |
|---|---|---|---|---|
| 1 | 0 | 800 | 80 | 9 |
| 2 | 0 | 1400 | 100 | 4 |
| 3 | 0 | 2000 | 150 | 2.3 |
| 4 | 20 | 800 | 100 | 2.3 |
| 5 | 20 | 1400 | 150 | 9 |
| 6 | 20 | 2000 | 80 | 4 |
| 7 | 40 | 800 | 150 | 4 |
| 8 | 40 | 1400 | 80 | 2.3 |
| 9 | 40 | 2000 | 100 | 9 |

FIG.8

| EXPERIMENT No | ETCHING RATE (nm/min) | D2 (nm) | ETCHING RATE / D2 ((nm/min)/nm) |
|---|---|---|---|
| 1 | 172.3 | 1017 | 0.17 |
| 2 | 241.0 | 586 | 0.41 |
| 3 | 296.3 | 557 | 0.53 |
| 4 | 123.0 | 1073 | 0.11 |
| 5 | 323.3 | 721 | 0.45 |
| 6 | 316.5 | 670 | 0.47 |
| 7 | 173.5 | 832 | 0.21 |
| 8 | 223.6 | 663 | 0.34 |
| 9 | 395.9 | 823 | 0.48 |

PLASMA PROCESSING METHOD, PLASMA PROCESSING APPARATUS AND STORAGE MEDIUM

CROSS REFERENCE TO PRIOR APPLICATIONS

This application claims priority from U.S. Provisional Application No. 60/792,978 filed Apr. 19, 2006 and Japanese Patent Application Nos. 2006-068049, filed Mar. 13, 2006 and JP 2006-286591, filed Oct. 20, 2006.

FIELD OF THE INVENTION

The present invention relates to a method for forming micro lenses that are used as, e.g., on-chip lenses for use in such a device as a CCD (charged coupled device) or an LCD (liquid crystal display) device.

BACKGROUND OF THE INVENTION

In a CCD solid state imaging device or a MOS (metal-oxide semiconductor) solid state imaging device, micro lenses are formed to improve the efficiency of focusing light to photosensitive parts, to thereby increase the amount of incident light upon pixels and improve the sensitivity of the device. The micro lenses corresponding to the pixels in one-to-one correspondence are arranged in, e.g., a matrix pattern. To ameliorate the sensitivity of the CCD or CMOS (complimentary metal-oxide-semiconductor) sensor, the micro lenses are required to be formed to have large areas to receive more light at their condensing points. Accordingly, a distance between neighboring micro lenses is required to be small. Specifically, as shown in FIGS. 10A and 10B a distance $D_1$ between micro lenses 100 in horizontally or vertically parallel positions to each other (hereinafter simply referred to as a horizontal or vertical distance $D_1$), and a distance $D_2$ between micro lenses in diagonal positions to each other (hereinafter, simply referred to as a diagonal distance $D_2$) need to be reduced.

Meanwhile, referring to FIG. 10C, used to form such micro lenses 3 is a wafer W on which a mask layer 103 is formed on an underlayer 101 via a lens material layer 102 made up of, e.g., an organic material, wherein the underlayer 101 is provided with a photosensitive part and a conductive film. The mask layer 103 is formed to have a lens shape as shown in FIG. 10C. By etching the mask layer 103 and the lens material layer 102 by a plasma of a processing gas including, e.g., a C-H-F based gas and an $O_2$ gas, the lens shape of the mask layer 103 is transcribed to the lens material layer 102, so that the micro lenses 100 are obtained.

When forming the mask layer 103 in the lens shape, the organic mask layer 103 is subjected to softening by a heat treatment after an exposure process. However, if the lenses are made to contact each other by the softening, the lens shape would be collapsed due to a surface tension therebetween. For the reason, the lenses are arranged at the horizontal or vertical distance $D_1$ of, e.g., 0.5 to 0.2 μm, and thus the diagonal distance $D_2$ between the lenses is set to be, e.g., 1 μm. Accordingly, intervals corresponding to $D_1$ and $D_2$ are also formed between the micro lenses 100 transcribed to the lens material layer 102.

Japanese Patent Laid-open Application No. 2005-101232 (paragraphs (0010) and (0015)) and Japanese Patent Laid-open Application No.H10-148704 (paragraphs (0049) and (0059)) disclose techniques for reducing the intervals between the micro lenses 100. These techniques attempt to reduce the intervals between the micro lenses 100 by accumulating deposits on sidewall portions of the lenses formed on the mask layer 103 and by etching the mask layer 103 and the lens material 102 simultaneously with the deposition. However, from the inspection of the inventor of the present invention, it is found that though the $D_1$ can be reduced to zero by those techniques, the speed with which the $D_2$ is narrowed (i.e., the decreasing rate of the $D_2$) is very slow. Accordingly, though it is possible to reduce the $D_1$ to zero within a processing time set by considering a throughput of a production line, the $D_2$ still remains great, thus impeding the improvement of the sensitivity of the solid state imaging device.

SUMMARY OF THE INVENTION

It is, therefore, an object of the present invention to provide a CCD solid state imaging device manufacturing method for forming micro lenses by performing an etching on a lens material layer made of an organic material via a resist mask, wherein the method is capable of forming micro lenses having large surface areas with a high productivity by reducing intervals between the micro lenses by means of performing a deposition of deposits on sidewalls of the micro lenses and the etching of the lens material layer simultaneously while supplying a high frequency power to a lower electrode such that the magnitude of the power divided by a surface area of a substrate is in a range from about 1200 W/31415.9 mm² to 2000 W/31415.9 mm².

It is another object of the present invention to provide a plasma processing apparatus capable of performing the CCD solid state imaging device manufacturing method as above; and a storage medium storing therein a computer-executable program for use in controlling the CCD solid state imaging device manufacturing method.

In accordance with a first aspect of the present invention, there is provided a plasma processing method for processing a substrate by using a plasma processing apparatus including an upper and a lower electrode configured to face each other; a high frequency power supply, connected to the lower electrode, for supplying a high frequency power into a processing chamber to convert a processing gas to a plasma; and a magnetic field generating unit for forming a magnetic field in the processing chamber, the method including the steps of:

loading the substrate on the lower electrode, the substrate having a resist mask of a lens shape formed on a transcription film made of an organic material;

supplying the processing gas including a gas made up of carbon and fluorine into the processing chamber;

forming the magnetic field, which is oriented toward one direction and perpendicular to a line connecting the upper and the lower electrode; and supplying the high frequency power to the lower electrode in the processing chamber while controlling the magnitude of the electric power divided by a surface area of the substrate to be in a range from about 1200 W/31415.9 mm² to 2000 W/31415.9 mm² to thereby form an electric field, converting the processing gas into the plasma by a magnetron discharge caused by a presence of an orthogonal electromagnetic field, and forming lenses on the transcription film by using the plasma.

It is preferable that the processing gas is a gaseous mixture including a first gas containing carbon and fluorine and a second gas containing carbon and fluorine, the second gas being different from the first gas.

It is preferable that the first gas is $C_4F_8$, $C_5F_8$, $C_4F_6$, $C_2F_6$ or $C_3F_8$, and the second gas is $CF_4$, $SF_6$, $C_2F_6$ or $C_3F_8$.

It is preferable that the resist mask is made of an organic material.

In accordance with a second aspect of the present invention, there is provided a plasma processing apparatus for forming lenses on a transcription film by performing a plasma processing on a substrate on which the transcription film made up of an organic material is formed, the apparatus including:

a processing chamber;

an upper and a lower electrode disposed in the processing chamber to face each other;

a gas supply unit for supplying a processing gas including a gas made up of carbon and fluorine into the processing chamber;

a magnetic field generating unit for forming a magnetic field, which is oriented toward one direction and perpendicular to a line connecting the upper and the lower electrode;

a high frequency power supply for supplying a high frequency power into the processing chamber while controlling the magnitude of the electric power divided by a surface area of the substrate to be in a range from about 1200 W/31415.9 mm$^2$ to 2000 W/31415.9 mm$^2$, to thereby convert the processing gas into a plasma; and a control unit for controlling the plasma processing method disclosed in the first aspect to be carried out.

In accordance with a third aspect of the present invention, there is provided a storage medium for storing therein a computer executable program for use in a plasma processing apparatus for forming lenses on a transcription film by performing a plasma processing on a substrate on which the transcription film made up of an organic material is formed, wherein the computer executable program controls the plasma processing method disclosed in the first aspect to be carried out.

In accordance with the embodiments of the present invention, in forming micro lenses by performing an etching on a lens material layer made of an organic material via a resist mask, a deposition of deposits on sidewalls of the micro lenses and the etching of the lens material layer are performed simultaneously while supplying a high frequency power to a lower electrode such that the magnitude of the power divided by a surface area of a substrate is in a range from about 1200 W/31415.9 mm$^2$ to 2000 W/31415.9 mm$^2$. Accordingly, intervals between the micro lenses can be reduced to form micro lenses having large surface areas quickly.

BRIEF DESCRIPTION OF THE DRAWINGS

The above and other objects and features of the present invention will become apparent from the following description of embodiments given in conjunction with the accompanying drawings, in which:

FIGS. 2A to 2D illustrate a method of forming the micro lenses in accordance with the embodiment of the present invention;

FIGS. 7A and 7B describe experiment conditions for a third experiment in accordance with the embodiment of the present invention;

FIG. 8 depicts a characteristic diagram showing a result of the third experiment in accordance with the embodiment of the present invention;

DETAILED DESCRIPTION OF THE EMBODIMENTS

Figure 1:
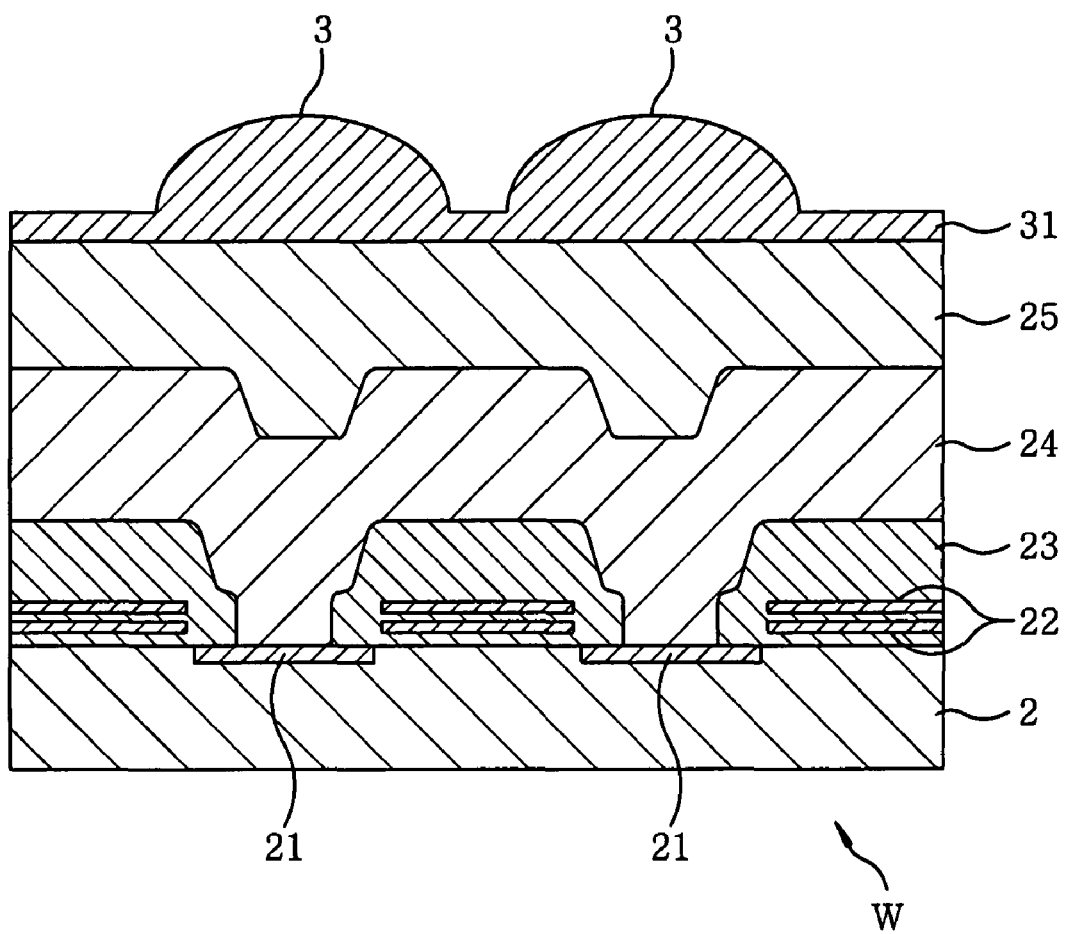
FIG. 1 is a cross sectional view of an exemplary CCD solid state imaging device having micro lenses in accordance with an embodiment of the present invention.

First, an exemplary configuration of a CCD solid state imaging device including micro lenses for use in an embodiment of the present invention will be explained with reference to FIG. 1. In the drawing, reference numeral 2 denotes an Si (silicon) film including photosensitive parts 21 arranged in a matrix pattern on a surface thereof, and incident light upon the photosensitive parts 21 are photoelectrically converted by photodiodes. In areas other than the areas directly over the photosensitive parts 21 disposed on the Si film 2, there is provided a conductive film 22 which forms a transfer electrode made of, e.g., poly-silicon. Further, a shading film 23 made of, e.g., aluminum is formed on the conductive film 22.

The shading film 23 serves to suppress an incidence of light on the conductive film 22 while allowing the light to be illuminated to the photosensitive parts 21. For this reason, openings are provided at areas of the shading film corresponding to the photosensitive parts 21, to pass incident light therethrough. On the shading film 23, a planarization film 24 made of, e.g., a polyimide-based or a polystyrene-based resin. A color filter layer 25 is formed on the planarization film 24, and micro lenses 3 made of organic materials, e.g., C, H and O are formed on the areas of the color filter layer 25 corresponding to the photosensitive parts 21. The micro lenses 3 serve to focus the light to the photosensitive parts 21. In order to collect more light, the micro lenses are formed to have an area larger than that of the photosensitive parts 21.

A method for forming the micro lenses 3 will now be described with reference to FIGS. 2A to 2D. First, photosensitive parts 21 are formed on the Si film 2, and, then, the conductive film 22 and the shading film 23 are formed thereon. Subsequently, on the resultant structure, the planarization film 24, the color filter layer 25, a transcription film 31 and a resist mask 32 are formed in this order. The transcription film 31 is made of organic materials, e.g., C, H and O. The resist mask 32 is made of a phenol-based or an acryl-based resist such as a KrF-based resist film or an X-ray based resist film. As shown in FIG. 2A, the resist mask 32 is patterned by a photolithography process and then heat-treated to a specific lens shape.

Then, as shown in FIG. 2B, the resist mask 32 and the transcription film 31 are etched simultaneously by a plasma of a processing gas including, e.g., $C_4F_8$ and $CF_4$ as a first and a second gas, respectively, whereby the lens shape of the resist mask 32 is transcribed to the transcription film 31. Here, since deposits are adhered to the sidewalls of lenses formed on the resist mask 32 as will be described later, if the accumulation of the deposits and the etching are performed at the same time, the sizes of the micro lenses 3 are increased, as shown in FIG. 2C. Finally, bottom sides of the micro lenses 3 contact bottoms sides of their neighboring ones, so that D1 is reduced to zero and D2 becomes infinitely close to zero, and the micro lenses 3 have specific shapes as shown in FIG. 2D.

The first gas such as $C_4F_8$ triggers a reaction, e.g., expressed by Eq. 1 below by a high frequency power to be described later, whereby $(CF_2)_n$ radicals $((CF_2)_{n*}, [*]$ represents radicals), which mainly act as deposits, are generated.

$$(CF_2)_n \rightarrow (CF_2)_n{}^* + CF_3{}^* \qquad \text{Eq. 1}$$

Here, since the deposits are accumulated on the sidewalls of the micro lenses 3 uniformly, the distance D1, which is shorter than D2, between the micro lenses 3 is shortened prior to D2, and after D1 finally becomes 0, D2 also becomes zero.

Meanwhile, the second gas such as $CF_4$ generates F radicals (F*), which mainly act to perform an etching, e.g., according to Eq. 2 provided below.

$$CF_4 \rightarrow CF_3{}^* + F^* \qquad \text{Eq. 2}$$

The F radicals generated by this reaction facilitate the etching of the resist mask 32 and the transcription film 31 as shown in Eq. 3 provided below, for example. Since this reaction allows generation of more abundant F radicals acting as etching species, etching is facilitated more than deposition is.

$$C(\text{resist mask 32 and transcription film 3}) + F^* \rightarrow CF^* \qquad \text{Eq. 3}$$

Further, the CF radicals (CF*) generated by Eq. 3 act on the first gas such as $C_4F_8$ as indicated by, e.g., Eq. 4 as below. Since this reaction of Eq. 4 allows generation of more deposit species such as $(CF_2)_n$ radicals and CF radicals, deposition is facilitated more than etching is.

$$(CF_2)_n + CF^* \rightarrow (CF_2)_n{}^* + CF_3{}^* \qquad \text{Eq. 4}$$

Here, though the micro lenses 3 are shown to have semi-circular shapes in FIG. 2, their curvatures can be varied depending on a type and/or a constitution of film. Further, it is also preferable to set the micro lenses 3 to have rectangular planar shapes by varying their X-directional and Y-directional curvatures. Moreover, though the micro lenses 3 are arranged in, e.g., a lattice pattern or a honeycomb pattern, distances between the micro lenses 3 can be set either same or different in their X and Y directions.

Figure 3:
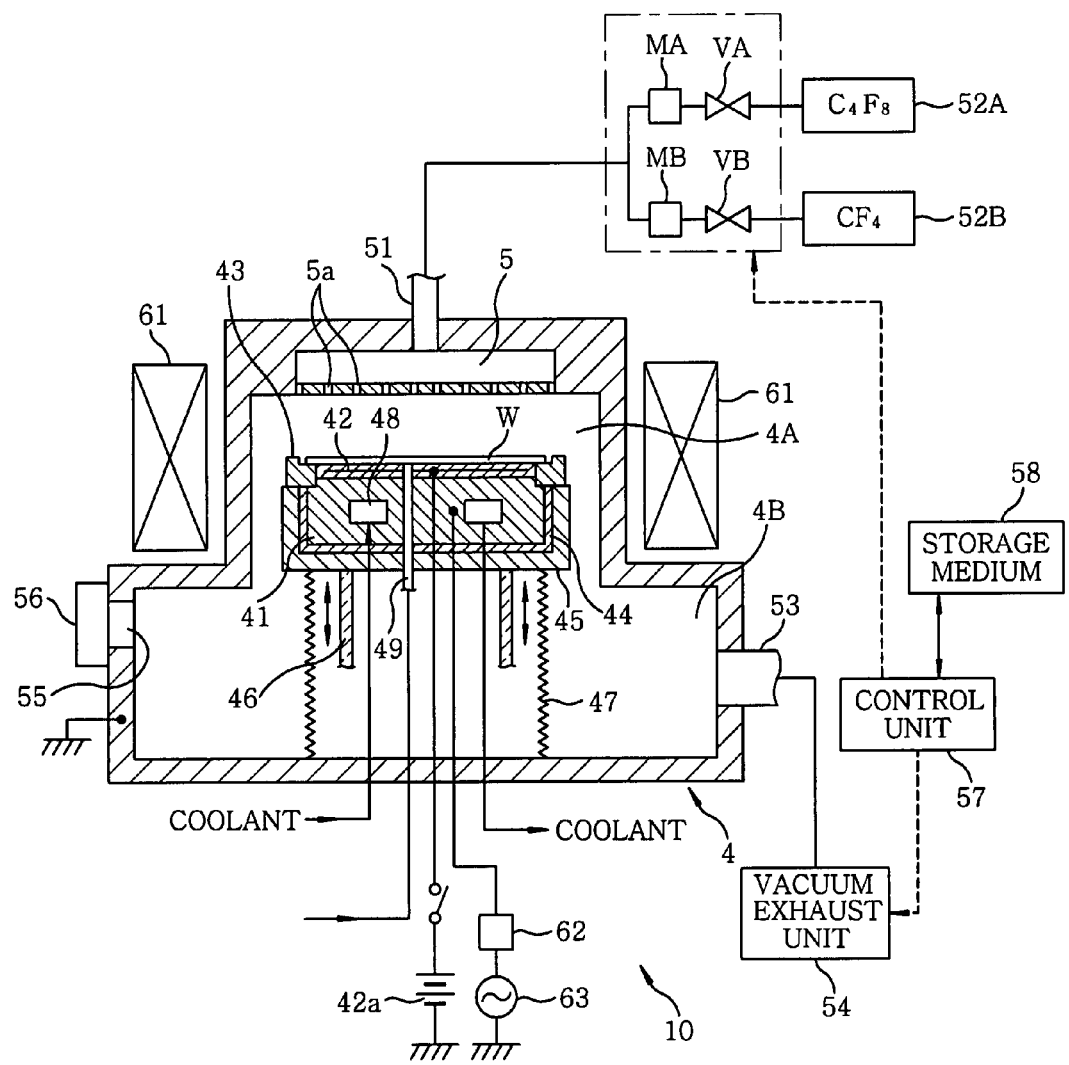
FIG. 3 provides a cross sectional view of an exemplary plasma processing apparatus 10 which performs an etching process for forming the micro lenses.

Now, a plasma processing apparatus 10 employed for forming the micro lenses 3 will be explained with reference to FIG. 3. The plasma processing apparatus 10 has a cylindrical processing chamber 4 whose wall is made of, e.g., aluminum. The processing chamber 4 is air-tightly sealed and is configured to have an upper room 4A and a lower room 4B larger than the upper room 4A, wherein the wall of the lower room 4B is grounded.

In the processing chamber 4, there is provided a mounting table 41 for horizontally supporting a semiconductor wafer W to be processed (hereinafter, referred to as "wafer W"). The mounting table 41, serving also as a lower electrode, is made of, e.g., aluminum. On the surface of the mounting table 41, there is provided an electrostatic chuck 42 for attracting and holding the wafer W by an electrostatic attracting force. The electrostatic chuck 42 is connected to a power supply unit 42a.

Further, a focus ring 43 is installed on the periphery of the top surface of the mounting table 41 to surround the electrostatic chuck 42. When a plasma is generated, the focus ring 43 functions to focus the plasma onto the wafer W loaded on the mounting table 41. The mounting table 41 is supported by a conductive support 45 via an insulating plate 44. The mounting table 41 is configured to move up and down by an elevation mechanism having, e.g., ball screws 46 via the support 45, between a mounting position where the top surface of the mounting table 41 locates in the lower room 4B and a processing position shown in FIG. 3. The support 45 is connected to the processing chamber 4 via a bellows 47 made of, e.g., stainless steel.

A coolant path 48 for circulating a coolant therethrough is formed inside the mounting table 41. By this circulation of the coolant, the surface temperature of the mounting table 41 is controlled to be kept at, e.g., 30° C. By this heat of the mounting table 41 and an incident heat from the plasma, the wafer W is maintained at a specific temperature level, e.g., about 100° C. In addition, in the mounting table 41, there is formed a gas channel 49 for supplying a backside gas between the electrostatic chuck 42 and the backside of the wafer W to facilitate the control of the temperature of the wafer W.

A gas supply room 5 also serving as an upper electrode is disposed in the area of the ceiling wall of the processing chamber 4, the area facing the mounting table 41. The gas supply room 5 is provided with a plurality of gas discharge openings 5a at its lower surface. A processing gas from a processing gas source is uniformly supplied to the surface of the wafer W through the gas supply room 5. A gas supply line 51 forming a gas supply unit is connected to the upper surface of the gas supply room 5, and connected upstream of the gas supply line 51 are a first gas source 52A for supplying, e.g., $C_4F_8$ via a mass flow controller MA and a value VA and a second gas source 52B for supplying, e.g., $CF_4$ via a mass flow controller MB and a valve VB.

Dispose around the upper room 4A of the processing chamber 4 is a dipole ring magnet unit 61 having plural columnar anisotropic segment magnets that form a magnetic field generating unit. The dipole ring magnet unit 61 generates a magnetic field of, e.g., 100 G in the upper room 4A. Further, a high frequency power supply 63 is connected to the mounting table 41 via a matching unit 62, and a high frequency power of, e.g., 13.56 MHz for plasma generation is applied to the mounting table 41. The gas supply room 5 and the mounting table 41 function as a pair of electrodes, and by generating a high frequency wave between the gas supply room 5 and the mounting table 41, the processing gas can be converted into the plasma therebetween. The processing chamber 4 is evacuated to a specific vacuum level by a vacuum exhaust unit 54 via a gas exhaust line 53. Further, a loading/unloading port 55 for the wafer W is formed at the sidewall of the processing chamber 4, and the loading/unloading port 55 is opened and closed by a gate valve 56.

The plasma processing apparatus 10 is provided with a control unit 57 having, e.g., a computer. The control unit 57 includes a program, a memory and a data processing unit having a CPU. The programs includes built-in commands for performing the plasma etching on the wafer W by transmitting control signals from the control unit 57 to each component of the plasma processing apparatus 10. The memory, for example, has a recording area in which processing parameters such as processing pressures, processing times, gas flow rates and power levels are recorded. These processing parameters are read by the CPU when the CPU executes each command of the programs, and control signals according to the read parameter values are transmitted to each component of the plasma processing apparatus 10. The programs (including programs upon an input manipulation or display of the processing parameters) are stored in a computer-readable storage medium 58 such as a flexible disk, a compact disk, an MO (magneto-optical) disk, or the like, and installed in the control unit 57.

Now, a plasma processing, which is an embodiment of the present invention, performed by the plasma processing apparatus 10 having the above configuration will be explained. First, through opening the gave value 56, a wafer W having a film structure shown in FIG. 2A is loaded into the processing chamber 4 by a wafer transfer mechanism (not shown) through the loading/unloading port 55, to be finally mounted on the mounting table 41 located at the aforementioned mounting position. Then, the wafer transfer mechanism is retreated out of the processing chamber 4, and the gate valve 56 is closed. The mounting table 41 is then moved up to the aforementioned processing position, and the processing chamber 4 is evacuated to a specific vacuum level by the vacuum exhaust unit 54. Subsequently, a processing gas including $C_4F_8$ as a first gas and $CF_4$ as a second gas is introduced into the processing chamber 4 from the gas supply room 5 at a specific flow rate ratio, thereby maintaining the pressure of the processing gas chamber 4 at a specific processing pressure level.

Meanwhile, a specific high frequency power of a frequency of, e.g., 13.56 MHz is applied from the high frequency power supply 63 to the mounting table 41 serving as the lower electrode, which is a cathode electrode, wherein the magnitude of the electric power divided by a surface area of a substrate (the wafer W) is controlled to be equal to or greater than, e.g., $1200 W/31415.9 mm^2$. As a result, a high frequency electric field is generated between the gas supply room 5 and the mounting table 41 functioning as the upper and the lower electrode, respectively. Here, since a horizontal magnetic field is formed by the dipole magnet unit 61 in the upper room 4A, an orthogonal electromagnetic field is formed in the processing chamber 4 in which the wafer W is located, and by the presence of the orthogonal electromagnetic field, electrons are made to drift, which in turn causes a magnetron discharge. As a result of the magnetron discharge, the processing gas is converted to a plasma, and the plasma processing of the transcription film 31 and the resist mask 32 on the wafer W are carried out by the plasma.

Figure 4:
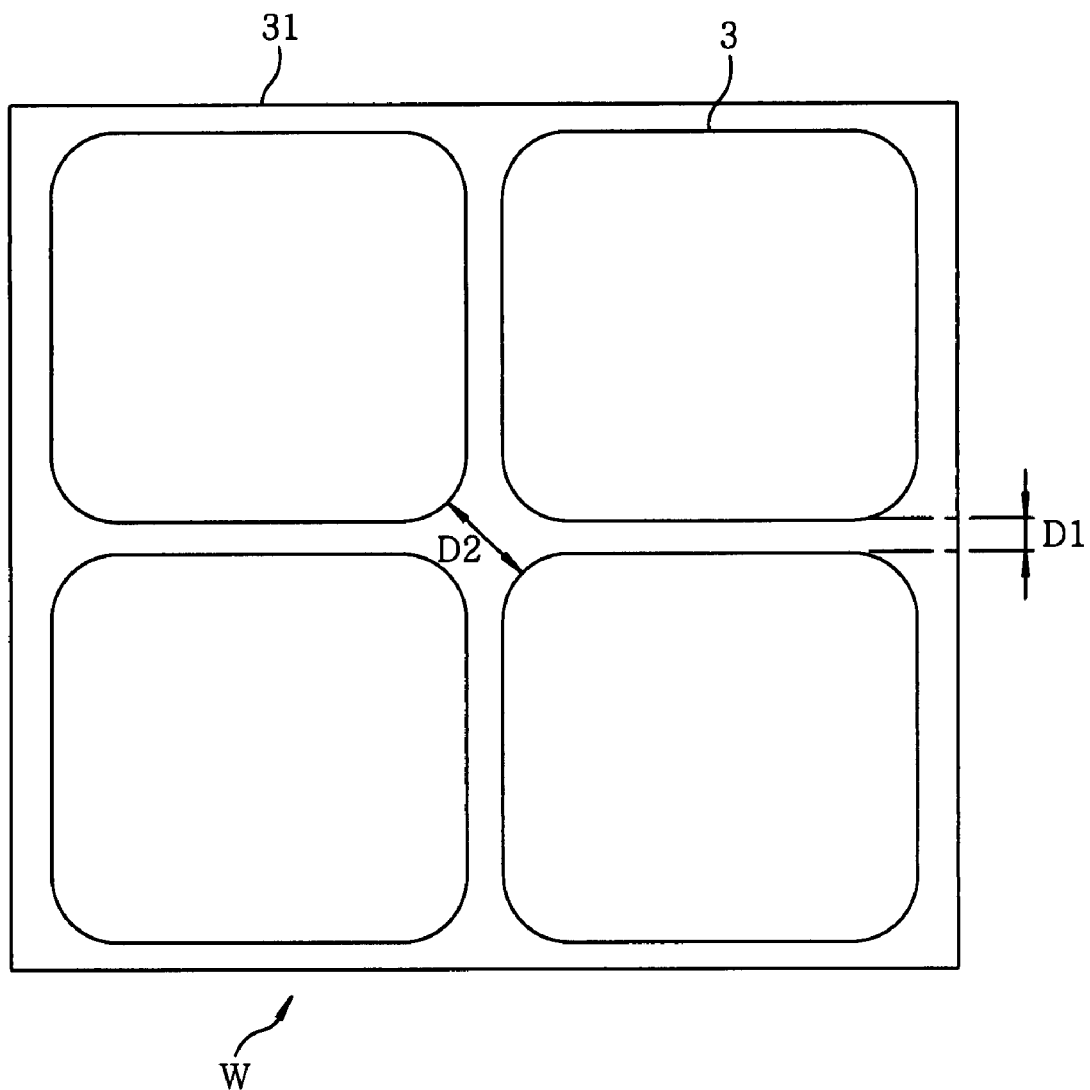
FIG. 4 sets forth a plan view of the exemplary CCD solid state imaging device having the micro lenses.

As can be clearly seen from experiments to be described later, by performing the plasma processing while supplying a high frequency power to the lower electrode such that the magnitude of the high frequency power divided by the surface area of the substrate is no smaller than $1200 W/31415.9 mm^2$, the generation amount of the $(CF_2)_n$ radicals increases, and thus the amount of the deposits accumulated on the sidewalls of the micro lenses 3 also increase. As a result, as shown in FIG. 4, the diagonal distance D2 between the micro lenses as well as the horizontal or vertical distance D1 therebetween is shortened rapidly, so that the bottom areas of the micro lenses 3 are enlarged, and the amount of light focused can be increased.

If the electric power supplied to the lower electrode is equal to or greater than $1200 W/31415.9 mm^2$, D1 and D2 are rapidly reduced. However, in case that electric power is greater than $2000 W/31415.9 mm^2$, it is believed that the micro lenses 3 would suffer damages by the plasma, resulting in an increase of a dark current and a deterioration of image characteristics of the lenses. Thus, it is preferable to set the high frequency power to range from $1200 W/31415.9 mm^2$ to $2000 W/31415.9 mm^2$.

By setting the high frequency power supplied to the lower electrode to be in such a range, not only the rapid reduction of D1 and D2 is possible but also an increase of the etching rate of the transcription film 31 is enabled due to a rapid progression of the reactions of Eq. 2 and Eq. 3, resulting in an improvement of productivity. That is, as can be confirmed from the following experiments, the amount of the transcription film 31 that can be etched for a time period necessary for reducing the D2 by a specific amount can be increased.

In the etching process described above, the sum of flow rates of the $CF_4$ and $C_4F_8$ gases is preferably set to be about 80 sccm to 150 sccm, and a flow rate ratio between the $CF_4$ and $C_4F_8$ gases ($CF_4/C_4F_8$) is preferably set to be in a range from about 2.3 to 2.9. Further, the internal pressure of the processing chamber 4 is preferably set to be in a range from about 1.3 Pa (10 Torr) to 26.6 Pa (199.5 Torr), and the temperature of the mounting table 41 is preferably set to be about 0° C. to 40° C. The electric power supplied to the lower electrode is preferably set to be in a range from about $1200 W/31415.9 mm^2$ to $2000 W/31415.9 mm^2$ (the surface area of a 8-inch wafer), and the magnetic field is preferably set to be in a range from about 60 G to 120 G.

It is preferable to use a processing gas made up of fluorine and carbon for this plasma processing. Specifically, other than the $C_4F_8$ gas, a $C_5F_8$ gas, a $C_4F_6$ gas, or the like can be employed as the first gas; and other than the $CF_4$ gas, a $SF_6$ gas can be employed as the second gas. Moreover, not one but plural of the aforementioned exemplary gases can be used as the first and the second gas. Meanwhile, since each of a $C_2F_6$ gas and a $C_3F_8$ can generate radicals for deposit and radicals for etching when they are used alone, it is possible to use one of these gases alone. Further, it is also possible to use a combination of one of these two gases; and another first or second gas, a rare gas such as Ar, or a dilution gas such as $N_2$.

Further, as can be clearly seen from the following experiments, the etching rate and the decreasing rate of $D_2$ can be improved by changing the temperature of the mounting table 41, the flow rate ratio between the $CF_4$ gas and the $C_4F_8$ gas ($CF_4/C_4F_8$) and the sum of the flow rates of the $CF_4$ and $C_4F_8$ gases. Accordingly, by optimizing these parameters appropriately while setting the high frequency power applied to the lower electrode to be in the range from $1200 W/31415.9 mm^2$ to $2000 W/31415.9 mm^2$, the performance of the micro lenses 3 and the productivity can be improved.

The plasma processing in accordance with the embodiment of the present invention can be performed on a wafer W having a transcription film 31 made of, e.g., organic materials such as C, H and O and a resist mask 32 formed on the transcription film 31. Preferably, the resist mask 32 is an organic film such as a KrF based or an i-line resist film.

Further, the plasma processing apparatus 10 in accordance with the embodiment of the present invention can have a configuration in which a high frequency power from the high frequency power supply 63 is supplied to the gas supply room 5 forming the upper electrode.

EXPERIMENTS

Below, the experiments conducted to investigate the effect of the present invention will be described.

Employed in the following experiments was a wafer W having a surface structure in which photosensitive parts 21, a conductive film 22 and a shading film 23 are formed on a Si film 2 having a diameter of 200 mm (8 inches), and, on the resultant structure, a planarization film 24, a color filter layer 25, an organic transcription film 31 made of C, H and O, and a resist mask 32 made of an i-line resist film of a specific lens shape are formed in this order, as shown in FIG. 2A.

Experiment 1

Initial Evaluation

Etching was performed on the wafer W shown in FIG. 2A under the following processing conditions, to thereby form micro lenses 3:
  frequency of the high frequency power supply 63: 13.56 MHz;
  electric power of the high frequency power supply 63: specified separately;
  processing pressure: 5.3 Pa (40 mTorr);
  processing gas: $CF_4/C_4F_8$=100/10 sccm;
  temperature of the wafer W: 30° C.; and
  processing time: etching was performed until 1.25 μm of the transcription film 31 was etched and immediately thereafter, the etching was stepped.

Example 1-1

In the above processing conditions, the electric power of the high frequency power supply 63 was set to be 1400 W.

Example 1-2

In the above processing conditions, the electric power of the high frequency power supply 63 was set to be 2000 W.

Comparative Example 1

In the above processing conditions, the electric power of the high frequency power supply was set to be 6000 W.

Experimental Results

After completing the etching, an etching rate and an etching rate uniformity of the transcription film 31 were evaluated by measuring the etched amount of the transcription film 31 at equi-spaced 13 positions on the wafer W, 5 mm distance away from the periphery of the wafer W, along its circumference, by using an optical film thickness measurement device. The result is shown in graphs of FIGS. 5A and 5B. Here, the etching rate uniformity represents a value obtained by dividing an etching rate variation by an absolute value of the etching rate, and as this approximates 0, the etching rate uniformity increases.

Figure 5A:
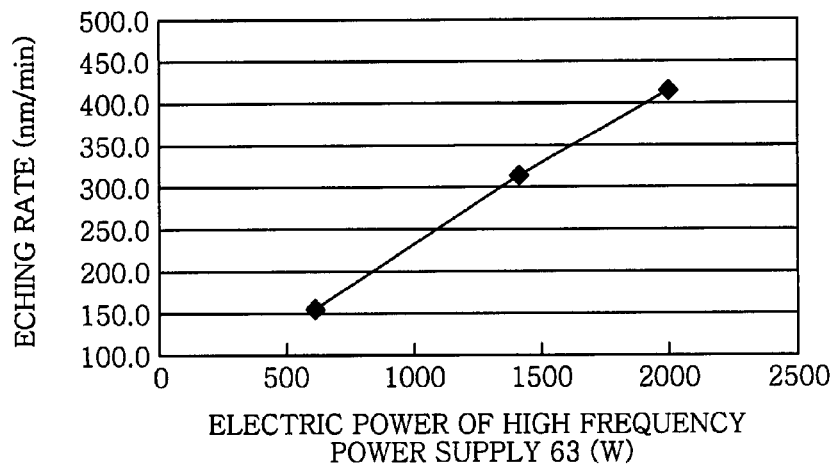
FIGS. 5A to 5D present characteristic views showing a result of a first experiment in accordance with the embodiment of the present invention.
Figure 5B:
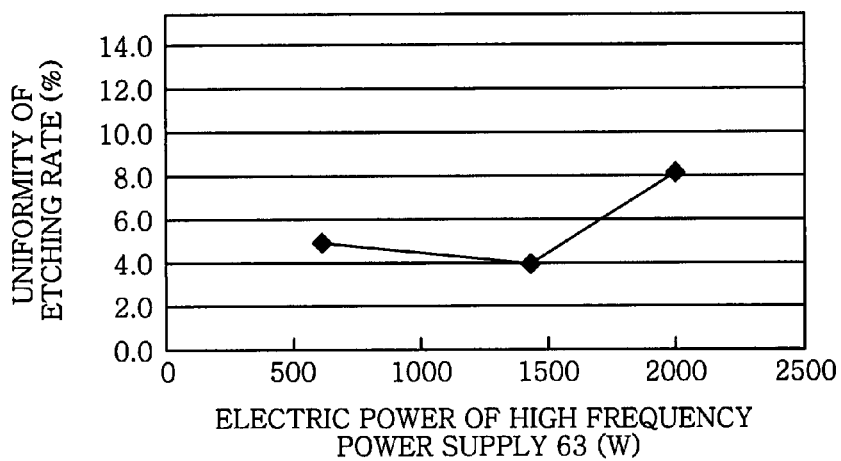
Figure 5C:
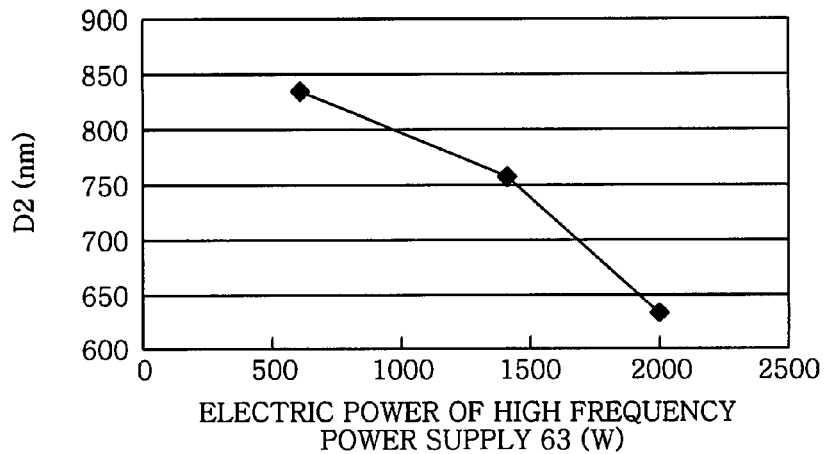
Figure 5D:
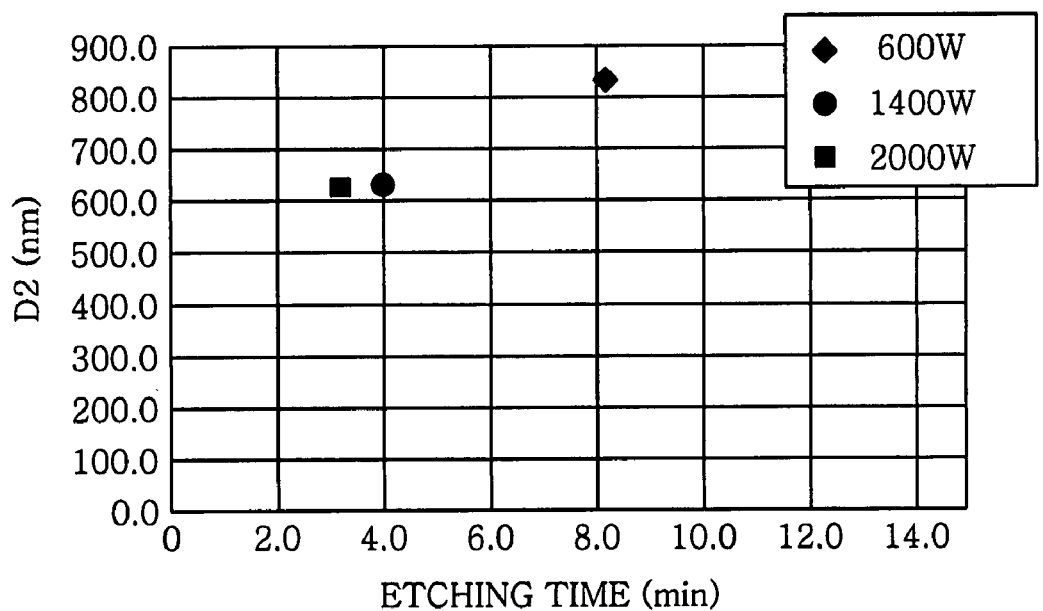

Further, $D_2$ was measured and the result is shown in graphs in FIGS. 5C and 5D which are provided in relation with the electric power of the high frequency power supply 63 and the etching time, respectively. Further, the reason why the processing time is not fixed at a specific value in every condition but set to be a time period necessary before the 1.25 μm of transcription film 31 is etched is to evaluate a distance of $D_2$ reduced by the etching of the specific amount of the transcription film 31, that is, to evaluate the areas of the micro lenses 3 which increase with the formation of the micro lenses 3 having a specific height.

In the result provided in FIG. 5A, the etching rate is found to increase in a linear manner as the electric power of the high frequency power supply 63 increases. Meanwhile, as shown in FIG. 5B, the etching rate uniformity is observed to decrease slightly at an electric power of 2000 W. This is deemed to be due to the phenomenon that though the etching rate improves with the increase of the amount of the F radicals in Eq. 2 resulted from the increase of the power, the plasma would be dispersed slightly at an edge portion of the wafer W, so that it cannot be applied to the wafer W surface uniformly. If the electric power of the high frequency power supply 63 is increased over 2000 W, the etching rate uniformity would be further deteriorated.

As for the variation of the distance $D_2$ shown in FIG. 5C, the distance $D_2$ decreases virtually in a linear manner with the increase of the electric power of the high frequency power supply 63. This is deemed to be due to the phenomenon that the amount of the $(CF_2)_n$ radicals generated by Eq. 1 increases with the increase of the electric power, and resultantly, the amount of the deposits accumulated on the sidewalls of the lenses formed on the resist mask 32 increases, as described above.

Moreover, as can be seen from FIG. 5D, the time required for reducing the distance $D_2$ decreases with the increase of the electric power of the high frequency power supply 63. From this, it can be said that the gas dissociation is facilitated with the increase of the electric power of the high frequency power supply 63, resulting in the increase of the amount of the $(CF_2)_n$ radicals.

From the above results, it is confirmed that the transcription film 31 can be etched rapidly and the distance $D_2$ can be reduced rapidly by increasing the electric power of the high frequency power supply 63.

Experiment 2

Evaluation of an Etching Time Dependency of the Distance $D_2$

In Experiment 2, etching was conducted under the same processing conditions as those of the Experiment 1 excepting the following parameters:
  electric power of the high frequency: specified separately
  processing time: specified separately.

Example 2-1

In the above processing conditions, the electric power of the high frequency power supply 63 and the processing time were set to be 1400 W and 4 minutes, respectively.

Example 2-2

In the above processing conditions, the electric power of the high frequency power supply 63 and the processing time were set to be 2000 W and 3 minutes, respectively.

Example 2-3

In the above processing conditions, the electric power of the high frequency power supply 63 and the processing time were set to be 2000 W and 5 minutes, respectively.

Example 2-4

In the above processing conditions, the electric power of the high frequency power supply 63 and the processing time were set to be 2000 W and 7 minutes, respectively.

Comparative Example 2

In the above processing conditions, the electric power of the high frequency power supply 63 and the processing time were set to be 600 W and 8 minutes, respectively.

Experimental Results

Figure 6:
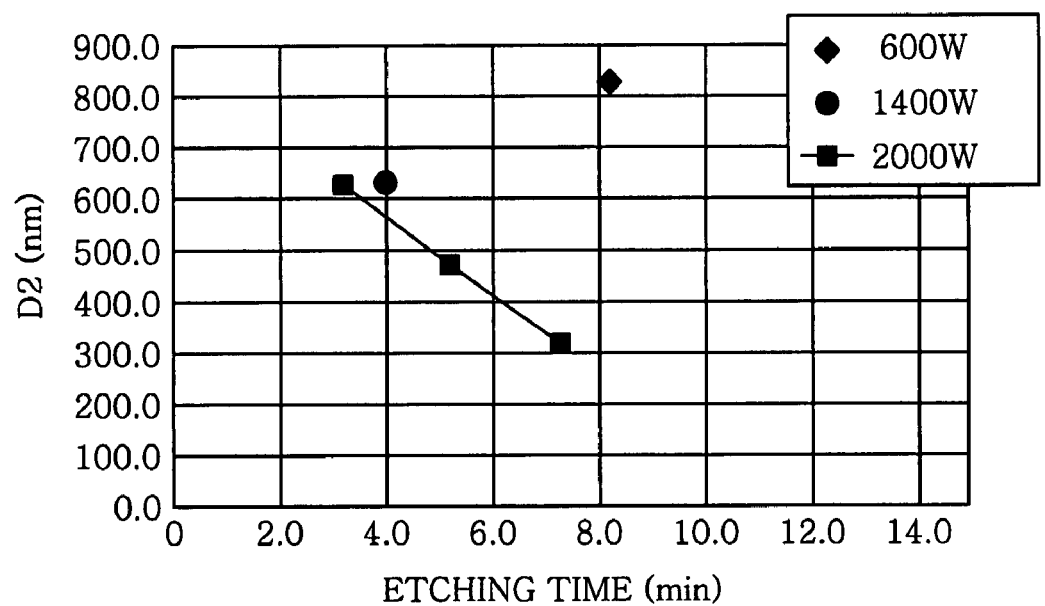
FIG. 6 gives a characteristic view showing a result of a second experiment in accordance with the embodiment of the present invention.

After the etching, a distance $D_2$ was measured as in the Experiment 1, and the result is provided in FIG. 6. When the electric power of the high frequency power supply 63 was set to be 2000 W, as the processing time increases, the distance $D_2$ is observed to decrease in a linear manner. Assuming that the distance $D_2$ is reduced by the same gradient in case the etching is performed for a processing time longer than that of the Example 2-4, the distance $D_2$ would be reduced to zero within a short period of time of about 11 minutes. Further, if this gradient is applied to the results of the Example 2-1 and the Comparative example 2, it is evaluated that about 12 minutes is required when an electric power of the high frequency power supply 63 is set to be 1400 W, while more than about 17 minutes is required when an electric power of the high frequency power supply 63 is set to be 600 W, in order to reduce the distance $D_2$ to zero.

Experiment 3

Experiment Planning Method

Though it is found effective to increase the electric power of the high frequency power supply 63 to reduce the distance $D_2$ within a short period time without deteriorating productivity, evaluations were made by using an experiment planning method in order to inspect a valid electric power range and other valid control parameters. The control parameters were selected as those which do not have adverse influences upon the productivity, the plasma processing apparatus 10 and subsequent processes after the etching: specifically, the control parameters were a temperature of the mounting table 41, an electric power of the high frequency power supply 63, a sum of flow rates of the $CF_4$ and $C_4F_8$ gases and a flow rate ratio between the $CF_4$ gas and $C_4F_8$ gas ($CF_4/C_4F_8$). A cross table of variations of these parameters is provided in FIG. 7A, and experimental conditions set based on this cross table are provided in FIG. 7B.

To set up the above experimental conditions, experiment Nos. and gas flow rates were set as follows, and other processing conditions were set identical with those for the Experiment 1.

Example 3-1

In order to set up the conditions of experiment No. 2, the flow rates of the $CF_4$ and $C_4F_8$ gases were set to be 80 sccm and 20 sccm, respectively.

Example 3-2

In order to set up the conditions of experiment No. 3, the flow rates of the $CF_4$ and $C_4F_8$ gases were set to be 105 sccm and 45 sccm, respectively.

Example 3-3

In order to set up the conditions of experiment No. 5, the flow rates of the $CF_4$ and $C_4F_8$ gases were set to be 135 sccm and 15 sccm, respectively.

Example 3-4

In order to set up the conditions of experiment No. 6, the flow rates of the $CF_4$ and $C_4F_8$ gases were set to be 64 sccm and 16 sccm, respectively.

Example 3-5

In order to set up the conditions of experiment No. 8, the flow rates of the $CF_4$ and $C_4F_8$ gases were set to be 56 sccm and 24 sccm, respectively.

Example 3-6

In order to set up the conditions of experiment No. 9, the flow rates of the $CF_4$ and $C_4F_8$ gases were set to be 90 sccm and 10 sccm, respectively.

Comparative Example 3-1

In order to set up the conditions of experiment No. 1, the flow rates of the $CF_4$ and $C_4F_8$ gases were set to be 72 sccm and 8 sccm, respectively.

Comparative Example 3-2

In order to set up the conditions of experiment No. 4, the flow rates of the $CF_4$ and $C_4F_8$ gases were set to be 70 sccm and 30 sccm, respectively.

Comparative Example 3-3

In order to set up the conditions of experiment No. 7, the flow rates of the $CF_4$ and $C_4F_8$ gases were set to be 120 sccm and 30 sccm, respectively.

Experimental Results

Figure 9:
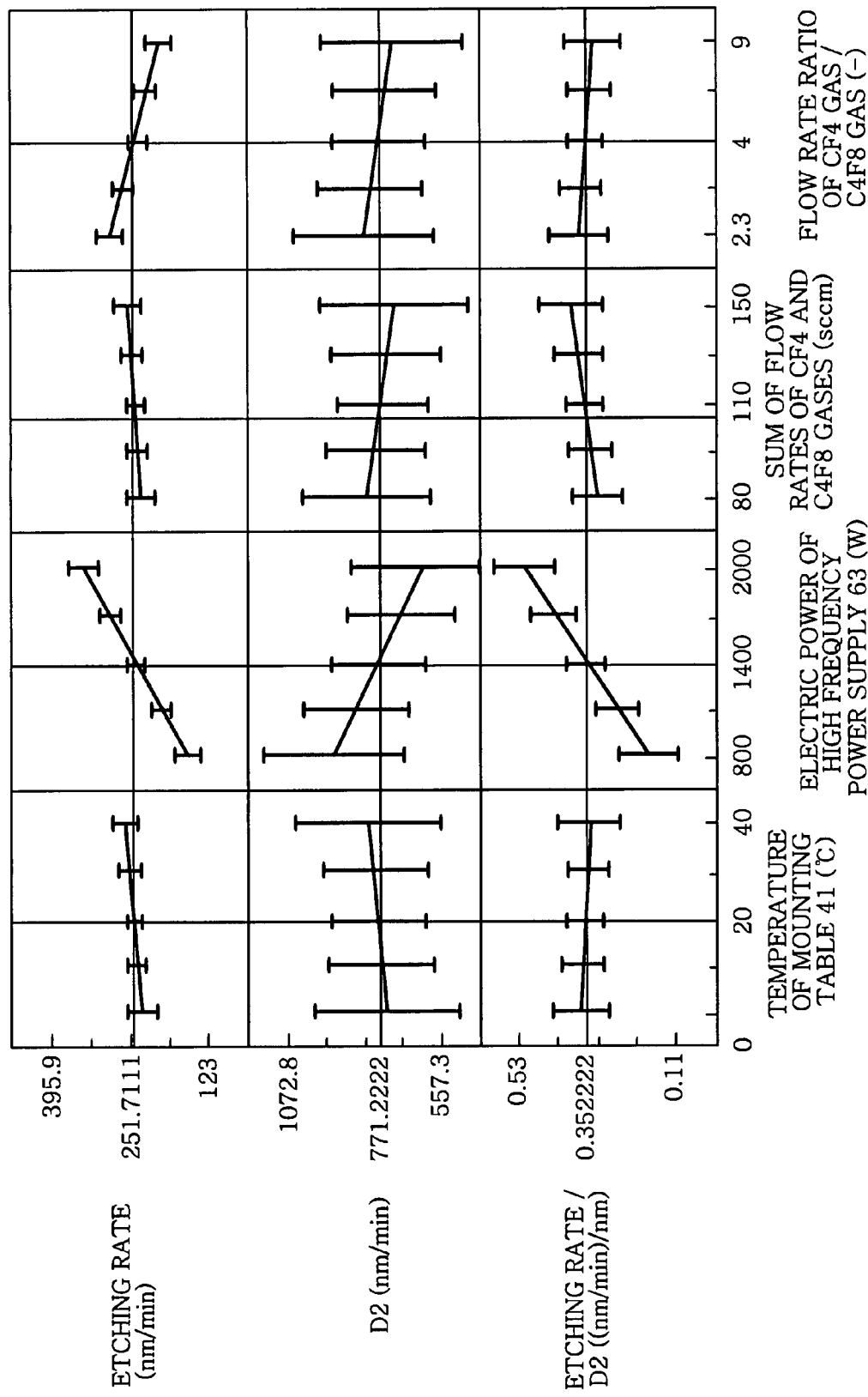
FIG. 9 is a characteristic view showing a result of an analysis of the experiment result of the third experiment in accordance with the embodiment of the present invention.
Figure 10A:
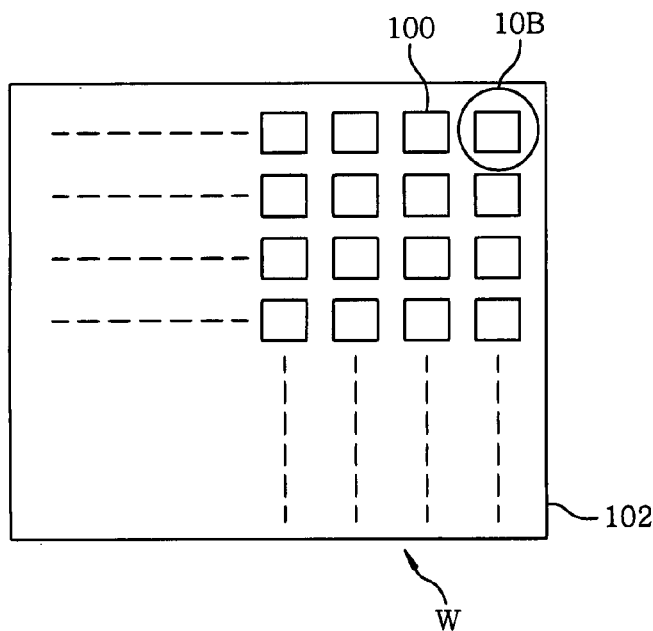
FIGS. 10A to 10C describe a conventional method of forming micro lenses.
Figure 10B:
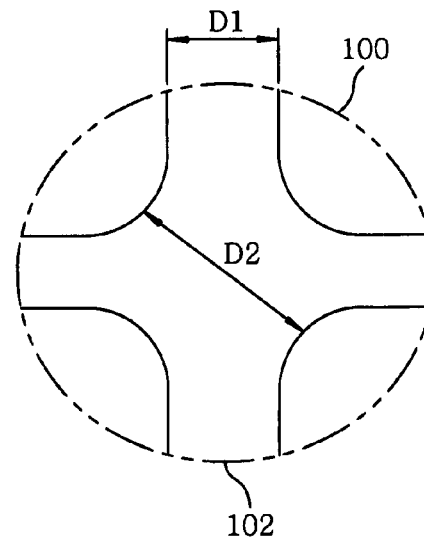
Figure 10C:
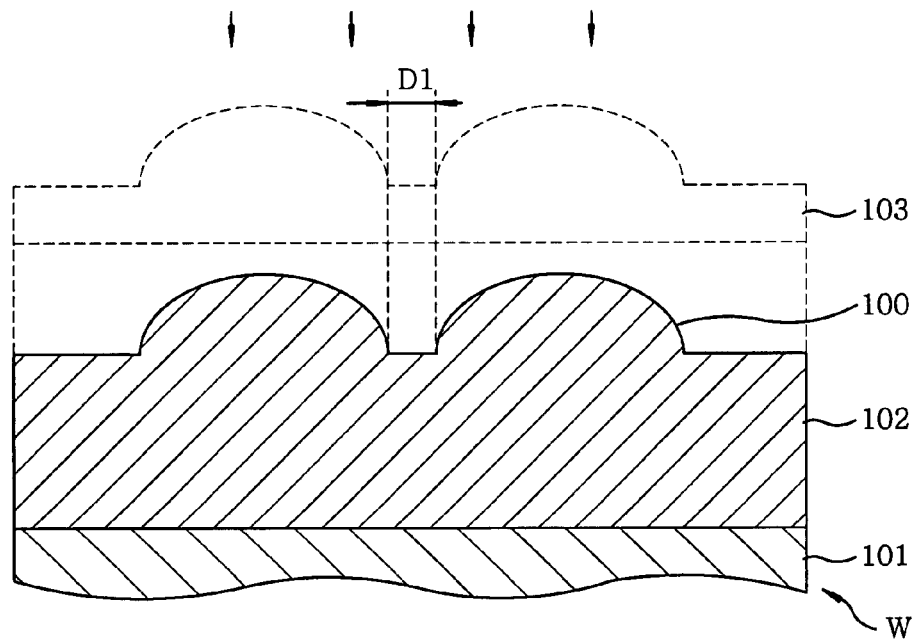

After the etching, an etching rate of the transcription film 31 was evaluated by measuring the etched amount of the transcription film 31 at equi-spaced 13 positions on the wafer W, 5 mm distance away from the periphery of the wafer W, along its circumference. Further, a distance $D_2$ was measured at a central portion of the wafer W and a wafer W's portion, 5 mm distance away from the periphery of the wafer W, and an average of the two values was used. Further, to evaluate their results synthetically, a value obtained by dividing the etching rate by the distance $D_2$ was calculated. That is, this value represents a depth of the transcription film 31 capable of being etched for a time period required to reduce a specific amount of $D_2$. As this value becomes greater, it implies that micro lenses 3 with larger bottom areas can be fabricated with a higher productivity. The results of the above experiments are provided in FIG. 8, and an analysis result of these experimental results, which was performed through an analysis of variance in the experiment planning method, is provided in FIG. 9.

From the analysis result, it is confirmed that a control parameter capable of reducing the distance $D_2$ most rapidly is an electric power of the high frequency power supply 63, and an optimum power range is found to be a range equal to or greater than 1200 W/31415.9 $mm^2$. It is deemed to be due to the fact that a generation amount of a plasma increases with an increase of the electric power, and thus a deposition rate of deposits and an etching rate increases as well, as explained earlier.

Though it is expected that the distance $D_2$ is also reduced in case an electric power of more than 2000 W/31415.9 $mm^2$ is supplied, the micro lenses 3 may suffer damages by the plasma in such a case as described earlier, resulting in an increase of a dark current and a deterioration of sensitivity of the lenses.

Further, image characteristics of the micro lenses 3 formed in these experiments were evaluated, and they were found to be improved in a linear manner with a fine sensitivity as the electric power increases. As for micro lenses 3 formed by supplying an electric power of 2000 W/31415.9 mm², no defect was found in their characteristics, so it is believed that they have suffered no damage from the plasma.

Experiment 4

An Additional Experiment

From the analysis result of the Experiment 3, an experiment for investigating a valid electric power range of the high frequency power supply 63 in the Experiment 1 was conducted.

Example 4

The experiment was conducted under the same processing conditions for the Experiment 1 excepting that the electric power of the high frequency power supply 63 was set to be 1200 W.

Experimental Result

As a result of the Experiment 4, the etching rate and the distance $D_2$ were observed to be 275 nm/min and 768 nm, respectively, which result is conceivable from the result of the Experiment 1. Further, a ratio of the etching rate to the distance $D_2$ was 0.3581/min, which is an appropriate value corresponding with the analysis result.

Experiment 5

Evaluation of an Etching Time Dependency of a Height of Micro Lenses 3

To confirm a correlation between an etching time and a height h of micro lenses 3, etching was performed under the following processing conditions, and after the etching, the height h of the micro lenses 3 was measured by taking SEM (scanning electron microscope) images (planar and cross sectional images) of the micro lenses 3. Further, employed in this experiment was a wafer W on which micro lenses 3 had been formed by the aforementioned forming method to have a height of 695 nm.

(Processing Conditions)
frequency of the high frequency power supply 63: 13.56 MHz;
electric power of the high frequency power supply 63: 1400 W;
processing pressure: 5.3 Pa (40 mTorr);
processing gas: $CF_4/C_4F_8$=100/10 sccm;
temperature of the wafer W: 0° C.;
processing time: 0, 236, 371, 491, 611, 731 sec

Experimental Result

Figure 11:
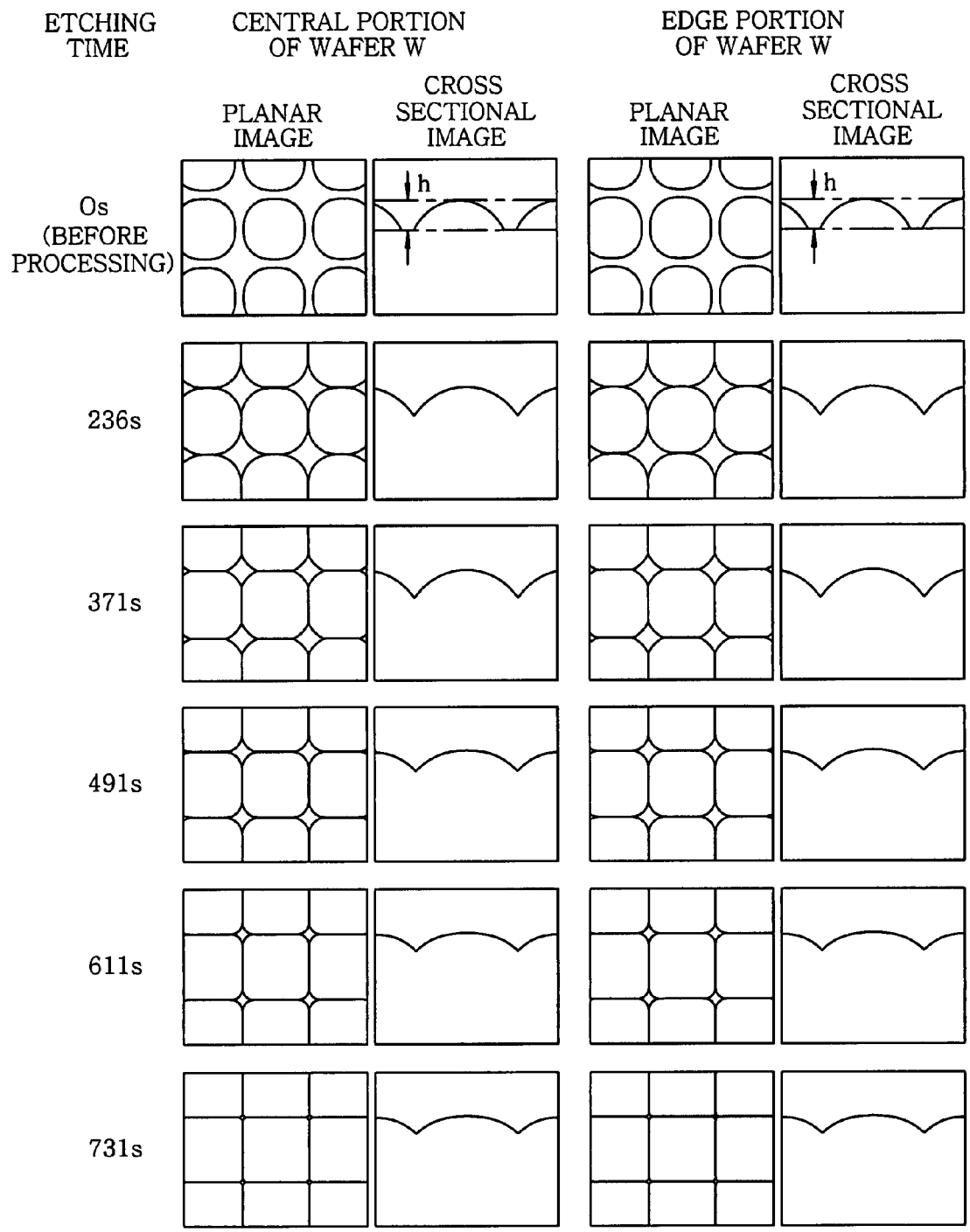
FIG. 11 shows SEM images obtained through a fifth experiment in accordance with the embodiment of the present invention.
Figure 12A:
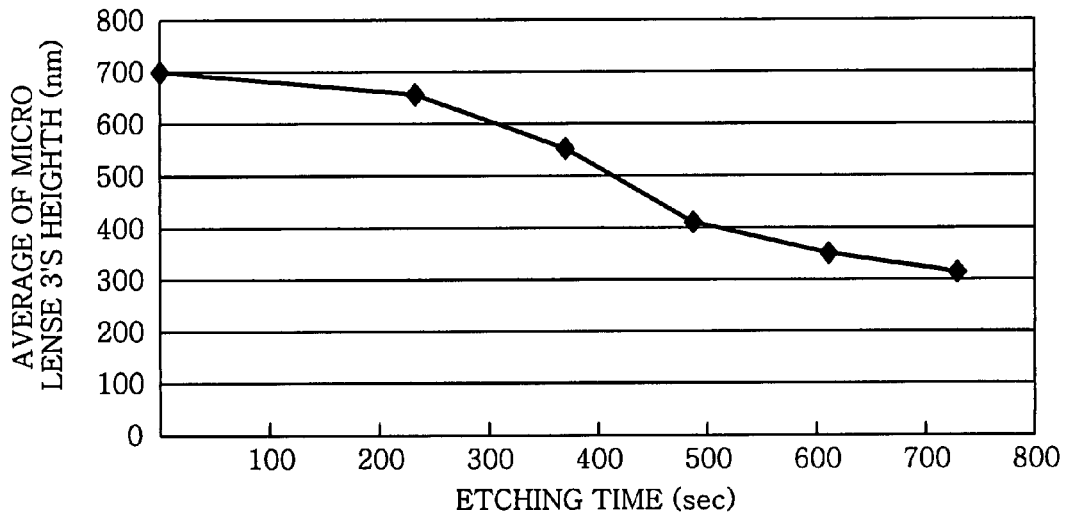
FIGS. 12A and 12B present characteristic views showing a result of the fifth experiment in accordance with the embodiment of the present invention.

FIG. 11 shows schematic diagrams of the SEM images (of 20000 magnifications) obtained in this experiment, and FIG. 12A and Table 1 show the height h of the micro lenses 3 obtained from the SEM images. As can be seen therefrom, the height h of the micro lenses 3 is found to decrease with a lapse of an etching time.

TABLE 1

| | Height h of micro lenses 3 (nm) | | |
|---|---|---|---|
| Etching time (sec) | Central portion of wafer W | Edge portion of wafer W | Average |
| 0 (before processing) | 695 | 695 | 695 |
| 236 | 668 | 648 | 658 |
| 371 | 571 | 539 | 555 |
| 491 | 409 | 409 | 409 |
| 611 | 351 | 355 | 353 |
| 731 | 309 | 316 | 313 |

After a lapse of the etching time of 236 seconds, a distance $D_1$ between the micro lenses 3 becomes zero to be described later, and, after then, the height h of the micro lenses 3 is found to decrease, though side dimensions (width and length) of the micro lenses 3 do not increase.

That is, as can be clearly seen from FIG. 11, the curvature of the micro lenses 3 is observed to decrease gradually with the lapse of the etching time.

Figure 13:
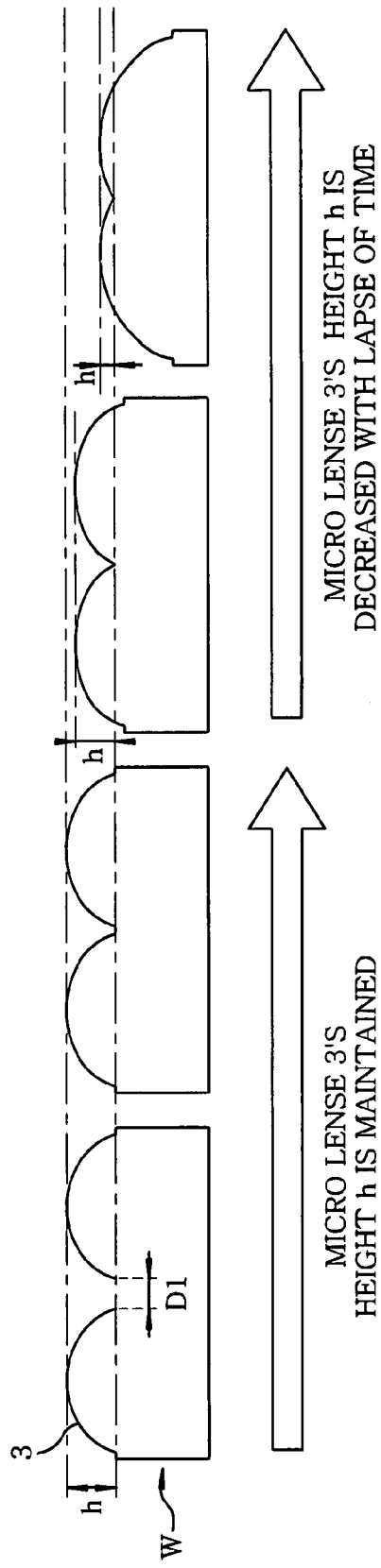
FIG. 13 describes an etching process of the fifth experiment in accordance with the embodiment of the present invention.

It is because, by a process similar to the aforementioned micro lenses 3 forming process, deposits are generated in between the micro lenses 3, i.e., groove portions therebetween, and the etching was progressed such that irregularities on the wafer W surface decrease (i.e., such that the surfaces of the micro lenses 3 have fluent curves). That is, as shown in FIG. 13, the etching is progressed with the height h of the micro lenses 3 maintained at a substantially same level until the distance $D_1$ between the micro lenses 3 becomes zero, and, after then, the height h of the micro lenses 3 decreases with the lapse of the etching time.

From this experimental result, it is confirmed that the micro lenses 3 can be controlled to have a desired curvature by adjusting the etching time.

Figure 12B:
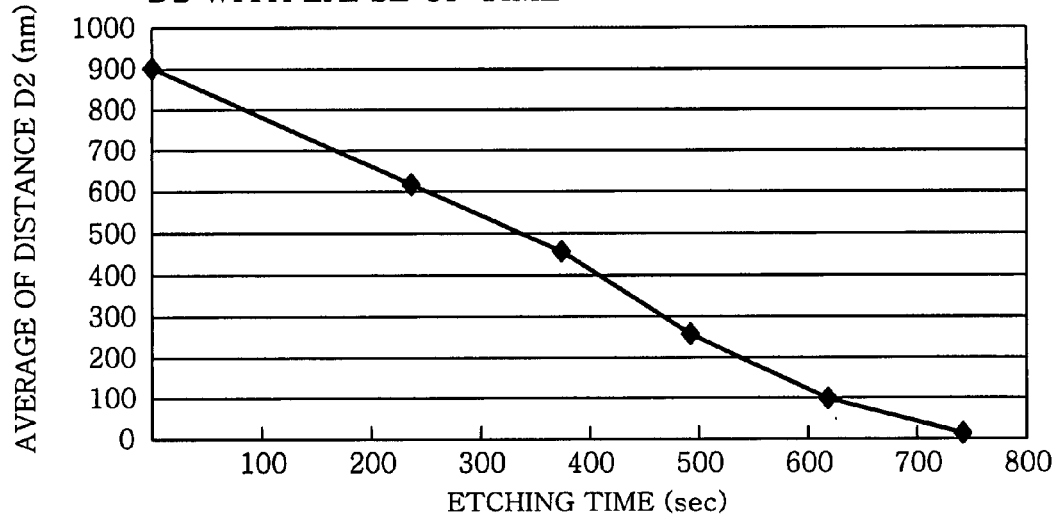

Moreover, a diagonal distance $D_2$ of the micro lenses 3 was also measured, and the result is provided in Table 2 and FIG. 12B.

TABLE 2

| | Distance D1 (nm) | | Distance D2 (nm) | | |
|---|---|---|---|---|---|
| Etching time (sec) | Central portion of wafer W | Edge portion of wafer W | Central portion of wafer W | Edge portion of wafer W | Average |
| 0 | 205 | 273 | 900 | 915 | 908 |
| 236 | 0 | 0 | 650 | 580 | 615 |
| 371 | 0 | 0 | 454.5 | 470 | 462 |
| 491 | 0 | 0 | 252.5 | 266.8 | 260 |
| 611 | 0 | 0 | 96.5 | 103.8 | 100 |
| 731 | 0 | 0 | 21.5 | 10 | 16 |

As a result, the $D_2$ is observed to decrease with the lapse of the etching time even in case the etching is performed for a time period longer than that set in the Experiment 2 described above.

Experiment 6

Validation of Reproducibility of the Experiment 5

To validate the reproducibility of the above-described Experiment 5, etching was performed under the same processing conditions as those for the Experiment 5 excepting that a wafer W etched to have micro lenses 3 of a height of 450 nm was employed in the Experiment 6. The result is provided in Table 3.

TABLE 3

| Etching time (sec) | Height h of micro lenses 3 (nm) |
|---|---|
| 0 | 450 |
| 533 | 296 |
| 593 | 258 |
| 623 | 258 |
| 743 | 229 |
| 863 | 210 |

In this experiment, the height h of the micro lenses 3 is observed to decrease with a lapse of the etching time, so that the reproducibility of the Experiment 5 can be obtained.

Experiment 7

Evaluation of Influences of Processing Conditions upon a Reduction of a Height h of Micro Lenses 3

To inspect how a change in processing conditions would affect the result of the Experiment 5, an experiment was conducted under the following conditions, and a wafer W processed as that used in the Experiment 5 was employed in this experiment.
(Processing Conditions)
frequency of the high frequency power supply 63: 13.56 MHZ;
electric power of the high frequency power supply 63: 2000 W;
processing pressure: 5.3 Pa (40 mTorr);
processing gas: $CF_4/C_4F_8$=180/20 sccm;
temperature of the wafer W: 0° C.;
processing time; 524 seconds.

Experimental Result

The result is provided in Table 4.

TABLE 4

|  | Central portion of wafer W | Edge portion of wafer W |
|---|---|---|
| Height h of micro lenses 3 (nm) | 318 | 312 |
| Distance D2 (nm) | 25 | 25.5 |

From the Table 4, the height h (curvature) of micro lenses 3 are found to decrease as well in the processing conditions of the Experiment 7, thus allowing a reduction of a distance $D_2$. Moreover, this result is identical to or better than the result expected from the gradients in graphs of FIGS. 12A and 12B obtained in the Experiment 5.

While the invention has been shown and described with respect to the embodiments, it will be understood by those skilled in the art that various changes and modifications may be made without departing from the scope of the invention as defined in the following claims.

What is claimed is:

1. A plasma processing method for processing a substrate by using a plasma processing apparatus including an upper and a lower electrode configured to face each other; a high frequency power supply, connected to the lower electrode, for supplying a high frequency power to a processing chamber to convert a processing gas to a plasma; and a magnetic field generating unit for forming a magnetic field in the processing chamber, the method comprising the steps of:

loading, on the lower electrode, a substrate having a resist mask formed on a transcription film made of an organic material, the resist mask having a plurality of lens shapes arranged in rows and columns across a surface of the substrate, the lens shapes in adjacent columns having a first distance between two adjacent lens shapes in the same row and having a second distance diagonally between two neighboring lens shapes in different rows;

supplying the processing gas including a gas made up of carbon and fluorine into the processing chamber;

forming the magnetic field, which is oriented toward one direction and perpendicular to a line connecting the upper and the lower electrode;

supplying the high frequency power to the lower electrode in the processing chamber to form an electric field that converts the processing gas into the plasma by magnetron discharge caused by a presence of an orthogonal electromagnetic field; and while supplying the high frequency power, controlling the magnitude thereof, as divided by the area of the surface of the substrate, to be in a range from about 1200 W/31415.9 $mm^2$ to 2000 W/31415.9 $mm^2$ to thereby cause the plasma to form lenses on the transcription film such that a distance corresponding to the first distance between adjacent lenses is shorter than the first distance, a distance corresponding to the second distance between two neighboring lenses is shorter than the second distance, and a decreasing rate of the distance corresponding to the second distance is improved.

2. The plasma processing method of claim 1, wherein the processing gas is a gaseous mixture including a first gas containing carbon and fluorine and a second gas containing carbon and fluorine, the second gas being different from the first gas.

3. The plasma processing method of claim 2, wherein the first gas is $C_4F_8$, $C_5F_8$, $C_4F_6$, $C_2F_6$ or $C_3F_8$, and the second gas is $CF_4$.

4. The plasma processing method of claim 1, wherein the resist mask is made of an organic material.

5. A plasma processing apparatus for forming lenses on a transcription film by performing a plasma processing on a substrate on which the transcription film made up of an organic material is formed, and on which a resist mask also is formed, the resist mask having a plurality of lens shapes arranged in rows and columns across a surface of the substrate, the lens shapes in adjacent columns having a first distance between two adjacent lens shapes in the same row and having a second distance diagonally between two neighboring lens shapes in different rows, the apparatus comprising:

a processing chamber;

an upper and a lower electrode disposed in the processing chamber to face each other;

a gas supply unit for supplying a processing gas including a gas made up of carbon and fluorine into the processing chamber;

a magnetic field generating unit for forming a magnetic field, which is oriented toward one direction and perpendicular to a line connecting the upper and the lower electrode;

a high frequency power supply for supplying a high frequency power into the processing chamber while controlling the magnitude thereof, as divided by a surface area of the substrate, to be in a range from about 1200 W/31415.9 $mm^2$ to 2000 W/31415.9 $mm^2$, to thereby convert the processing gas into a plasma; and a control unit for controlling the plasma processing method to carry out:

loading the substrate on the lower electrode;

supplying the processing gas into the processing chamber;

forming the magnetic field in the processing chamber; and supplying the high frequency power to the lower electrode in the processing chamber while controlling the magnitude thereof to be in said range to thereby form an electric field that converts the processing gas into the plasma by a magnetron discharge caused by a presence of an orthogonal electromagnetic filed, forms lenses on the transcription film such that a distance corresponding to the first distance between adjacent lenses is shorter than the first distance, and a distance corresponding to the second distance between two neighboring lenses is shorter than the second distance, and a decreasing rate of the distance corresponding to the second distance is improved.

6. The plasma processing apparatus of claim 5, wherein the gas supply unit is configured to supply a gaseous mixture including a first gas containing carbon and fluorine and a second gas containing carbon and fluorine into the processing chamber, the second gas being different from the first gas.

7. A non-transitory storage medium storing therein a computer executable program for use in a plasma processing apparatus including an upper and a lower electrode configured to face each other; a high frequency power supply, connected to the lower electrode, for supplying a high frequency power into a processing chamber to convert a processing gas to a plasma; and a magnetic field generating unit for forming a magnetic field in the processing chamber, the computer executable program controls the plasma processing method to carry out:

loading on the lower electrode, a substrate having a resist mask formed on a transcription film made of an organic material, the resist mask having a plurality of lens shapes arranged in rows and columns across a surface of the substrate, the lens shapes in adjacent columns having a first distance between two adjacent lens shapes in the same row and having a second distance diagonally between two neighboring lens shapes in different rows;

supplying the processing gas including a gas made up of carbon and fluorine into the processing chamber;

forming the magnetic field, which is oriented toward one direction and perpendicular to a line connecting the upper and the lower electrode; and supplying the high frequency power to the lower electrode in the processing chamber to form an electric field that converts the processing gas into the plasma by magnetron discharge caused by a presence of an orthogonal electromagnetic field; and while supplying the high frequency power, controlling the magnitude thereof, as divided by a the area of the surface of the substrate, to be in a range from about 1200 W/31415.9 mm$^2$ to 2000 W/31415.9 mm$^2$ to to cause the plasma to form lenses on the transcription film such that a distance corresponding to the first distance between adjacent lenses is shorter than the first distance, a distance corresponding to the second distance between two neighboring lenses is shorter than the second distance, and a decreasing rate of the distance corresponding to the second distance is improved.

8. The plasma processing method of claim 1, wherein the lenses are formed by etching the resist mask and the transcription film simultaneously by using the plasma.

9. The plasma processing method of claim 2, wherein deposits generated from the first gas by the high frequency power are accumulated on sidewalls of the lenses while etching the resist mask and the transcription film simultaneously by using the plasma.

10. The plasma processing apparatus of claim 5, wherein the lenses are formed by etching the resist mask and the transcription film simultaneously by using the plasma.

11. The plasma processing apparatus of claim 6, wherein deposits generated from the first gas by the high frequency power are accumulated on sidewalls of the lenses while etching the resist mask and the transcription film simultaneously by using the plasma.

12. The storage medium of claim 7, wherein the lenses are formed by etching the resist mask and the transcription film simultaneously by using the plasma.

13. The storage medium of claim 7, wherein the processing gas is a gaseous mixture including a first gas containing carbon and fluorine and a second gas containing carbon and fluorine, the second gas being different from the first gas, and wherein deposits generated from the first gas by the high frequency power are accumulated on sidewalls of the lenses while etching the resist mask and the transcription film simultaneously by using the plasma.

\* \* \* \* \*